United States Patent
Komatsuzaki

(10) Patent No.: US 11,531,103 B2
(45) Date of Patent: Dec. 20, 2022

(54) MEASUREMENT APPARATUS AND MEASUREMENT METHOD

(71) Applicant: Mitutoyo Corporation, Kanagawa (JP)

(72) Inventor: Shinji Komatsuzaki, Ibaraki (JP)

(73) Assignee: Mitutoyo Corporation, Kanagawa (JP)

( * ) Notice: Subject to any disclaimer, the term of this patent is extended or adjusted under 35 U.S.C. 154(b) by 401 days.

(21) Appl. No.: 16/892,124

(22) Filed: Jun. 3, 2020

(65) Prior Publication Data
US 2020/0379113 A1 Dec. 3, 2020

(30) Foreign Application Priority Data
Jun. 3, 2019 (JP) .............................. JP2019-103768

(51) Int. Cl.
*G01S 17/34* (2020.01)
*G01S 7/497* (2006.01)
*H01S 3/083* (2006.01)
*H01S 3/067* (2006.01)

(52) U.S. Cl.
CPC .............. *G01S 17/34* (2020.01); *G01S 7/497* (2013.01); *H01S 3/06791* (2013.01); *H01S 3/083* (2013.01)

(58) Field of Classification Search
CPC ................................. G01S 17/34; G01S 7/497
See application file for complete search history.

(56) References Cited

U.S. PATENT DOCUMENTS

2013/0044311 A1* 2/2013 Rakuljic ................. G01S 17/34
356/5.09

FOREIGN PATENT DOCUMENTS

JP          3583906 B2     11/2004

OTHER PUBLICATIONS

Hara "Distance Sansing by FSL Laser and its Application", Optonews, vol. 7, No. 3. 2012. pp. 25-31 (with machine generated English translation).

* cited by examiner

*Primary Examiner* — Jerry T Jean Baptiste
(74) *Attorney, Agent, or Firm* — Oblon, McClelland, Maier & Neustadt, L.L.P.

(57) ABSTRACT

A measurement apparatus that includes a laser apparatus outputting a frequency-modulated laser beam, a branching part branching the frequency-modulated laser beam into a reference light and a measurement light, a beat signal generation part generating a beat signal by mixing the reference light and a reflected light that is reflected by radiating the measurement light onto an object to be measured, an extraction part extracting a signal component corresponding to a resonator frequency of the frequency-modulated laser beam, a clock signal generation part generating a first clock signal on the basis of the signal component, a conversion part converting the beat signal into a first digital signal using the first clock signal, and a calculation part calculating a difference in a propagation distance between the reference light and the measurement light on the basis of the first digital signal.

10 Claims, 10 Drawing Sheets

MEASUREMENT APPARATUS AND MEASUREMENT METHOD

CROSS-REFERENCE TO RELATED APPLICATIONS

The present application claims priority to Japanese Patent Application number 2019-103768, filed on Jun. 3, 2019. The contents of this application are incorporated herein by reference in their entirety.

BACKGROUND OF THE INVENTION

A frequency-shifted feedback laser (FSFL) which is provided with a frequency shifter in a resonator and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31).

An optical distance meter using a frequency-shifted feedback laser (FSFL) can acquire a large amount of three-dimensional information in a contactless manner, and has been used, for example, in design and production sites. The FSFL sometimes caused a reduction in measurement accuracy of the optical distance meter, since the resonator length may change due to environmental fluctuations such as temperature. In order to prevent the reduction in the measurement accuracy, conventionally, it has been considered to reduce the environmental fluctuations by installing the FSFL in a constant-temperature chamber, to observe a change in the resonator length by monitoring outputs of the FSFL, and the like. However, such measures cause an increase in the scale of the apparatus and lead to a problem of an increase in cost and the like.

BRIEF SUMMARY OF THE INVENTION

The present disclosure has been made in view of this problem, and an object of the disclosure is to suppress a reduction of accuracy with a simple configuration even if environmental fluctuations occur in an optical distance meter.

A first aspect of the present disclosure provides a measurement apparatus, including: a laser apparatus that has a laser resonator and outputs a frequency-modulated laser beam with a plurality of modes; a branching part that branches the frequency-modulated laser beam into (i) a portion of the frequency-modulated laser beam output by the laser apparatus as a reference light and (ii) at least some of the remaining portion of the frequency-modulated laser beam as a measurement light; a beat signal generation part that generates a beat signal by mixing the reference light and a reflected light that is reflected by radiating the measurement light onto an object to be measured; an extraction part that extracts a signal component corresponding to a resonator frequency of the laser resonator and being superimposed on the frequency-modulated laser beam output from the laser apparatus; a clock signal generation part that generates a first clock signal on the basis of the signal component; a conversion part that converts the beat signal into a first digital signal using the first clock signal; and a calculation part that calculates a difference in a propagation distance between the reference light and the measurement light on the basis of the first digital signal.

A second aspect of the present disclosure provides a measurement method including the steps of outputting a frequency-modulated laser beam with a plurality of modes from a laser apparatus having a laser resonator; branching the frequency-modulated laser beam into (i) a portion of the frequency-modulated laser beam as a reference light and (ii) at least some of the remaining portion of the frequency-modulated laser beam as a measurement light; generating a beat signal by mixing the reference light and a reflected light that is reflected by radiating the measurement light onto an object to be measured; extracting a signal component corresponding to a resonator frequency of the laser resonator and superimposed on the frequency-modulated laser beam; generating a first clock signal on the basis of the signal component; converting the beat signal into a first digital signal using the first clock signal; and calculating a difference in a propagation distance between the reference light and the measurement light on the basis of the first digital signal.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution of the disclosure.

[Configuration Examples of a Measurement Apparatus 100]

Figure 1:
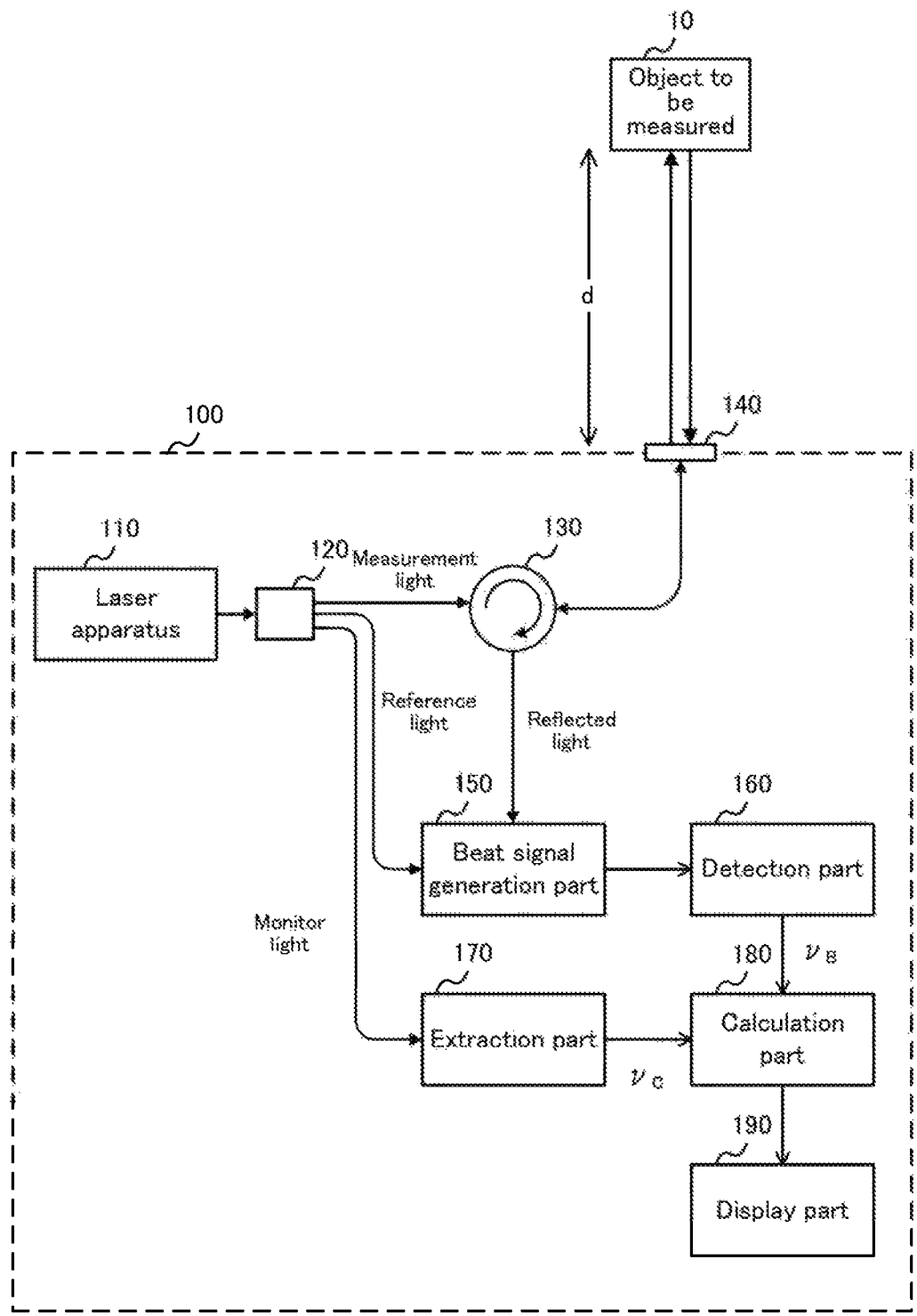
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of the laser beam radiated onto the object to be measured 10. The measurement apparatus 100 includes a laser apparatus 110, a branching part 120, an optical circulator 130, an optical head part 140, a beat signal generation part 150, a detection part 160, an extraction part 170, a calculation part 180, and a display part 190.

The laser apparatus 110 has a laser resonator and outputs a frequency-modulated laser beam with a plurality of modes. The laser apparatus 110 is provided with a frequency shifter in a resonator, and outputs a plurality of longitudinal mode lasers whose oscillation frequencies change linearly with the passage of time. The laser apparatus 110 is, for example, a frequency-shifted feedback laser (FSFL). The FSFL will be described later.

The branching part 120 branches the frequency-modulated laser beam output from the laser apparatus 110 into a reference light, a measurement light, and a monitor light. The branching part 120 is, for example, a one-in-three-out fiber optic coupler. In the example of FIG. 1, the branching part 120 supplies the measurement light to the optical circulator 130, the reference light to the beat signal generation part 150, and the monitor light to the extraction pan 170. FIG. 1 shows the example in which the branching part 120 is the one-in-three-out optical coupler, but the branching part 120 may alternatively be a combination of two one-in-two-out optical couplers.

The optical circulator 130 has a plurality of input/output ports. For example, the optical circulator 130 outputs a light, which is input from one port, to the next port, and outputs a light, which is input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using the collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a condenser lens. In this case, the optical head part 140 focuses the light input from the optical circulator 130 via the optical fibers on the surface of the object to be measured 10. The optical head part 140 receives at least a part of the reflected light reflected on the surface of the object to be measured 10. The optical head part 140 focuses the received reflected light onto an optical fiber using the condenser lens and supplies the light to the optical circulator 130. Also in this case, the optical head part 140 may include one common condenser lens, and that condenser lens may irradiate the object to be measured 10 with the measurement light and receive the reflected light from the object to be measured 10.

The beat signal generation part 150 receives, from the optical circulator 130, the reflected light that is the measurement light radiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electrical signal, and outputs the electrical signal.

Here, since the reflected light travels back and forth across the distance from the optical head part 140 to the object to be measured 10, a difference in a propagation distance corresponding to at least the distance $2d$ occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The detection part 160 detects the frequency of the beat signal by frequency-analyzing the beat signal generated by the beat signal generation part 150. Here, the frequencies of the beat signals are defined as $v_B$.

The extraction part 170 extracts a signal component corresponding to the resonator frequency of the laser resonator and is superimposed on the frequency-modulated laser beam output from the laser apparatus 110. For example, the extraction part 170 extracts the resonator frequency corresponding to the resonator length of the laser apparatus 110 on the basis of the monitor light. Here, the resonator frequency is defined as $v_c$.

The calculation part 180 detects a difference of the propagation distance between the reference light and the measurement light based on a detection result of the detection part 160 and an extraction result of the extraction part 170. For example, the calculation part 180 calculates the distance d from the optical head part 140 to the object to be measured 10 on the basis of the frequency $v_B$ of the beat signal and the resonator frequency $v_c$.

The display part 190 displays the calculation result of the calculation part 180. The display part 190 may include a display or the like and display the calculation result. Also, the display part 190 may store the calculation result in a storage unit or the like. The display part 190 may supply the calculation result to an external device via a network or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter Next, a more detailed configuration of the measurement apparatus 100 will be described.

[Configuration Example of the Laser Apparatus 110]

Figure 2:
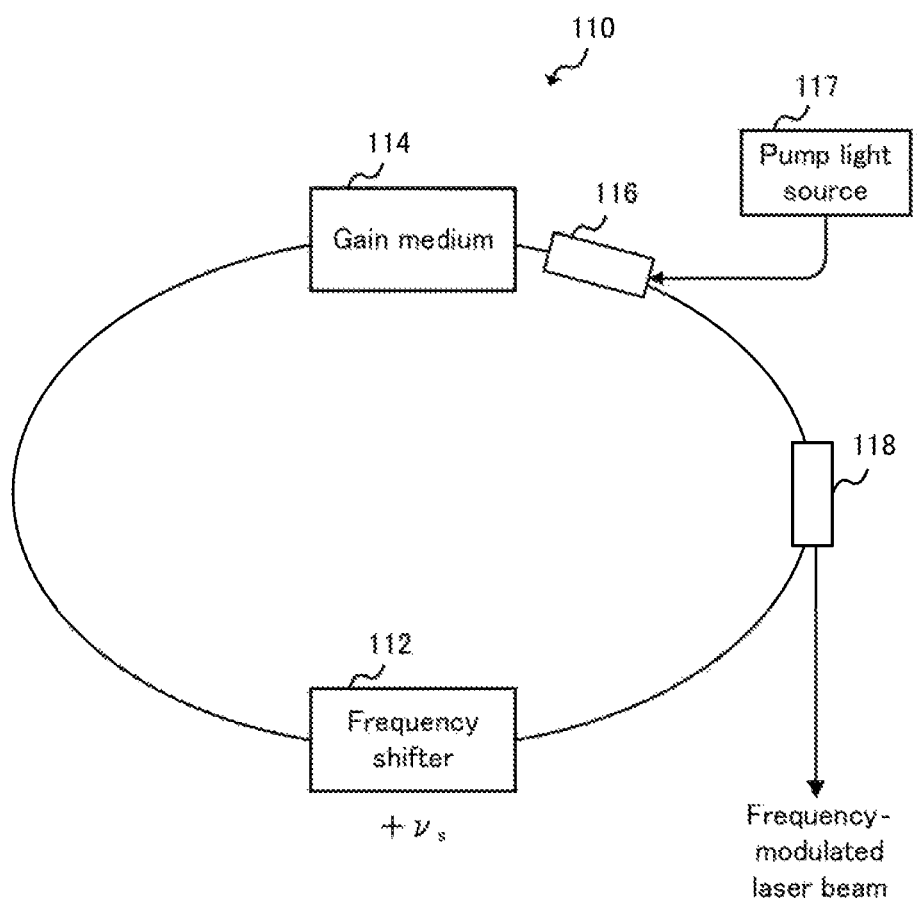
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL The laser apparatus 110 includes a laser resonator and oscillates a laser beam in the laser resonator. The laser resonator of the laser apparatus 110 includes a laser resonator including a frequency shifter 112, again medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acusto-optic elements. Here, an amount of the frequency shift by the frequency shifter 112 is defined as $+v_s$. That is, the frequency shifter 112 shifts the frequency of the light circulating around the resonator to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the resonator.

That is, the laser apparatus 110 shown in FIG. 2 contains a fiber ring laser having the frequency shifter 112 in the resonator. The laser apparatus 110 preferably further includes an isolator in the resonator. Also, the laser apparatus 110 may have an optical bandpass filter that passes light of a predetermined wavelength band in the resonator. Frequency characteristics of the laser beam output from the laser apparatus 110 will be described below.

Figure 3:
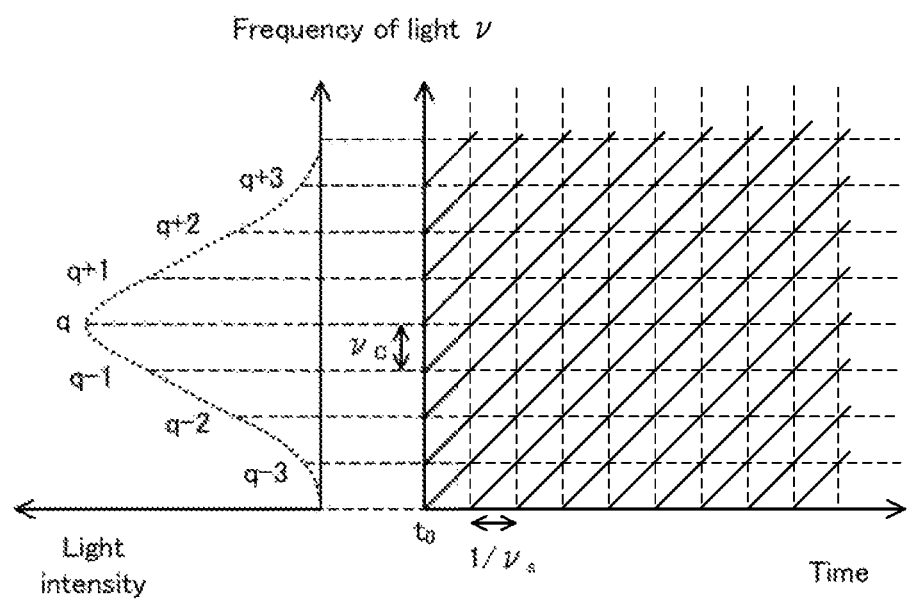
FIG. 3 shows an example of a laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output by the laser apparatus 110 at the time $t_0$. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_c)$ denotes the time for light to go around the resonator, the plurality of longitudinal modes are arranged at intervals of $1/\tau_{RT}(=v_c)$, as represented by the following equation. It should be noted that, $v_0$ is the initial frequency of the light spectrum at the time to.

$$v_q(t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time $t_0$ on the left side.

In the laser apparatus 110, each time the light in the resonator goes around the resonator, the frequency shifter 112 increases the frequency of the light traveling around the resonator by $v_s$. That is, since the frequency of each of the modes increases by $v_s$ for every passing of $\tau_{RT}$, the rate of change of frequency dv/dt (i.e. chirp rate) becomes approximately equal to $v/\tau_{RT}$. Therefore, the plurality of longitudinal modes represented by Equation 1 change as shown in the following equation with the passage of the time t.

$$v_q(t) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance $2d$, which is the reciprocated distance d, and the propagation delay corresponding to the distance $2d$ is $\Delta t$. That is, when the measurement light is reflected and returned from the object to be measured 10 at the time t, the frequency of the returned reflected light approximately matches the past frequency that is a time $\Delta t$ earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \quad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers ($=q-q'$) and $\Delta t = 2d/c$.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT} = v_c$.

$$d = \frac{c}{2v_s v_c}\{v_B(m, d) + mv_c\} \quad \text{[Equation 6]}$$

From Equation 6, it can be understood that the distance d can be calculated from a frequency observation result of the beat signal by determining the interval m of the longitudinal mode numbers. It should be noted that the interval m can be determined by detecting a change in beat signals when the amount of frequency shift $v_s$ of the laser apparatus 110 is changed. Since such a method of determining the interval m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
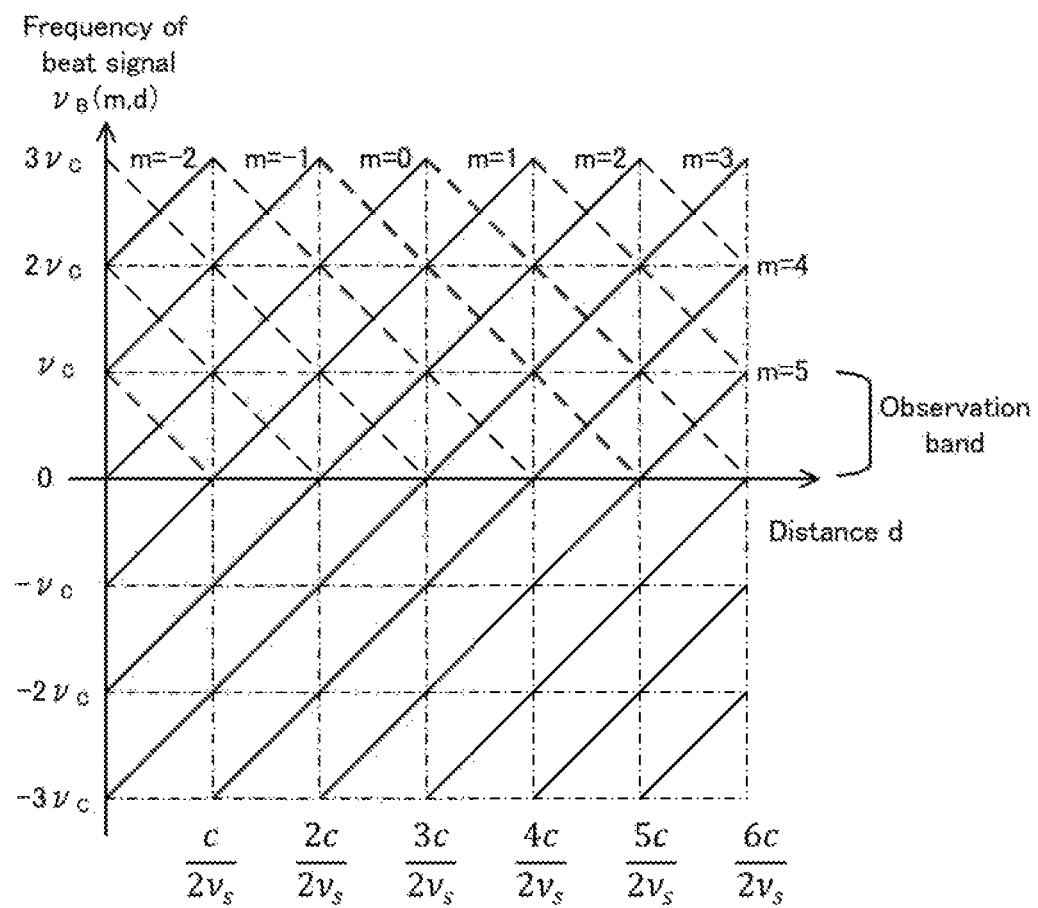
FIG. 4 shows an example of a relationship between (i) a frequency of the beat signal detected by the measurement apparatus 100 according to the present embodiment and (ii) a distance d between an optical head part 140 and the object to be measured 10.

FIG. 4 shows an example of the relationship between the frequency of the beat signal detected by measurement apparatus 100 according to the present embodiment and the distance d between the optical head part 140 and the object to be measured 10. In FIG. 4, the horizontal axis indicates the distance d, and the vertical axis indicates the frequency $v_B$(m, d) of the beat signal. The plurality of straight lines shown by the solid lines in FIG. 4 are graphs showing the relation of the frequency $v_B$(m, d) of the beat signal with respect to the distance d for each of the plurality of values of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superimposed on the approximately same frequency on the frequency axis. For example, when a frequency band between frequencies 0 and $v_c$ is observed, a plurality of beat signals are superimposed on approximately the same frequency and are observed as a single line spectrum.

In addition, the absolute value of the frequency $v_B$ (m, d) of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative of the folded image signals are inverted, the image signals are superimposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_c$, two line spectra are generated, which are (i) the beat signal $v_B$(m, d) and (ii) the image signal $v_B$(m', d) whose value of m is different from that of the beat signal $v_B$(m, d). Here, as an example, m'=m+1. In this case, the beat signal generation part 150 can cancel such an image signal by using a quadrature detection. Next, the beat signal generation part 150 and the detection part 160 using the quadrature detection will be described.

Figure 5:
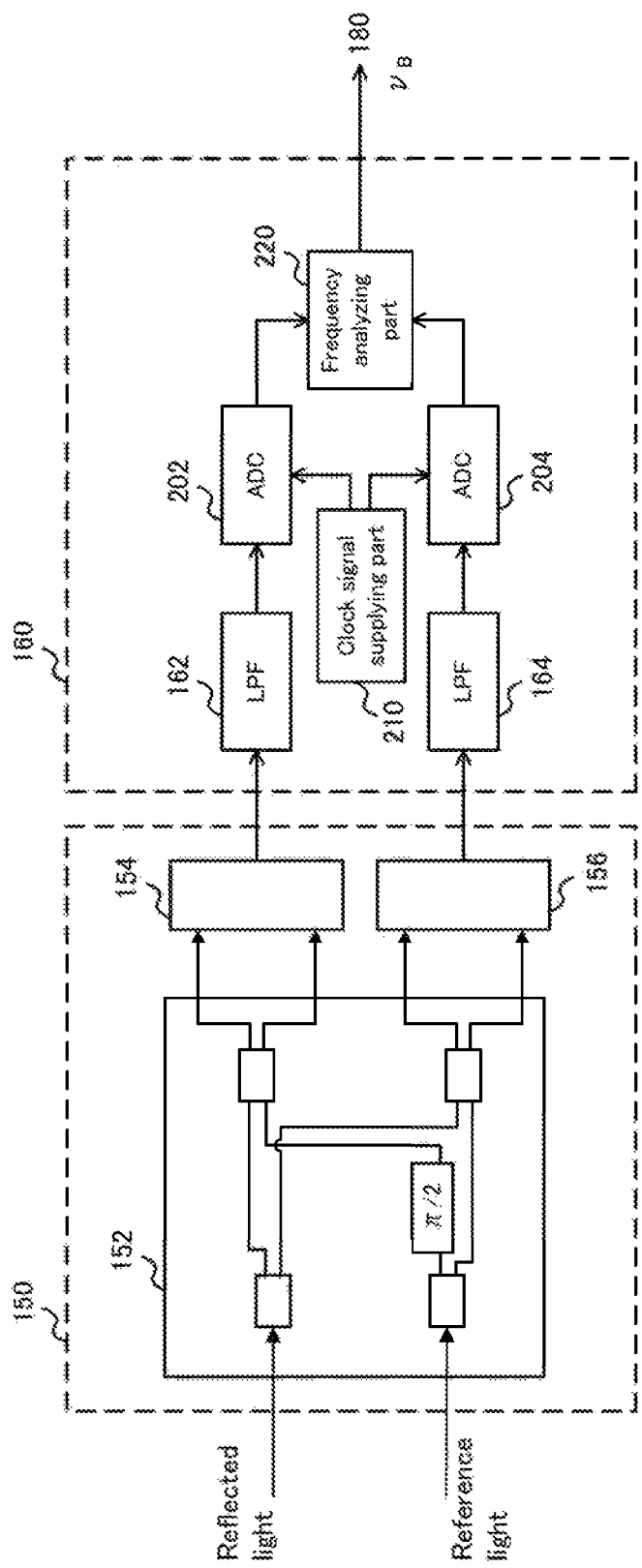
FIG. 5 shows a configuration example of a beat signal generation part 150 and a detection part 160 according to the present embodiment.

FIG. 5 shows a configuration example of the beat signal generation part 150 and the detection part 160 according to the present embodiment. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a π/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 136 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the detection part 160.

The detection part 160 performs a frequency analysis on the two beat signals. Here, an example in which the detection part 160 performs the frequency analysis using the first beat signal as an I signal and the second beat signal as a Q signal will be described. The detection part 160 includes a first filter part 162, a second filter part 164, a first AD converter 202, a second AD converter 204, a clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD converter 202. Also, the second filter pan 164 supplies the second beat signal obtained by reducing the signal components having a frequency higher than the frequency $v_c$ to the second AD converter 204.

The first AD converter 202 and the second AD converter 204 convert analog signals into digital signals. For example, the first AD converter 202 converts the first beat signal into a digital signal, and the second AD converter 204 converts the second beat signal into a digital signal. The clock signal supplying part 210 supplies clock signals to the first AD converter 202 and the second AD converter 204. By doing this, the first AD converter 202 and the second AD converter 204 convert the analog signals into the digital signals at approximately the same sampling rate as a clock frequency of the received clock signal.

Here, when the observation band is from 0 to $v_c$, the frequency of the beat signals is at most the resonator frequency $v_c$ of the laser resonator. Therefore, the clock signal supplying part 210 supplies clock signals having a frequency greater than or equal to twice the resonator frequency $v_c$ of the laser resonator to the first AD converter 202 and the second AD converter 204, whereby the beat signals can be observed.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. It should be noted that after the beat signals are converted into the digital signals, the detection part 160 may configure the frequency analyzing part 220 using an integrated circuit or the like. The quadrature detection in the beat signal generation part 150 and the frequency analysis in the detection part 160 will be described below.

Figure 6:
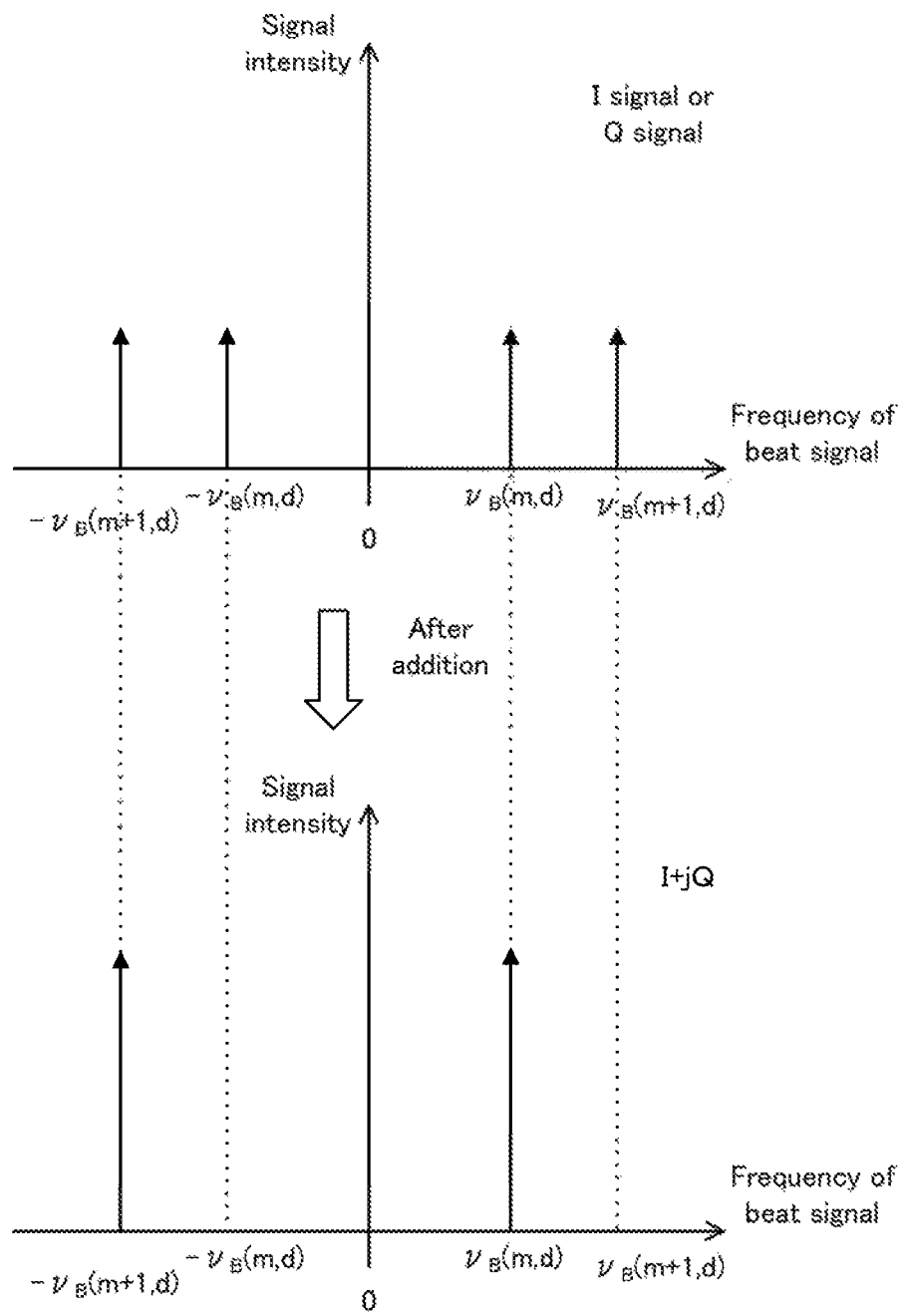
FIG. 6 shows an example of an outline of a quadrature detection by the beat signal generation part 150 and the detection part 160 according to the present embodiment.

FIG. 6 shows an example of an outline of quadrature detection by the beat signal generation part 150 and the detection part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the Q signal, for example, a beat signal $v_B(m, d)$ and an image signal $v_B(m+1, d)$ are observed in a frequency band between the frequencies 0 and $v_c$. In this case, in the I and Q signals, a beat signal $-v_B(m, d)$ and an original beat signal $-v_B(m+1, d)$ of the image signal exist in a frequency band between the frequencies 0 and $-v_c$ on the negative side.

Here, since the I signal and the Q signal am signal components being quadrature-detected by the beat signal generation part 150, they include different phase information even if the spectral shapes are the same. For example, in the frequency band between the frequencies 0 and $v_c$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_c$ on the negative side, phases of the beat signal $-v_B(m, d)$ of the I signal and the beat signal $-v_B(m, d)$ of the Q signal are mutually inverted.

Therefore, as shown in the lower part of FIG. 6, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_c$. Similarly, in the frequency band between the frequencies 0 and $-v_c$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_c$. Since the measurement apparatus 100 can cancel out the image signal in this manner, the frequency $v_B(m, d)$ of the beat signal can be detected. For example, the frequency analyzing part 220 outputs, as the frequency $v_B(m, d)$ of the beat signal, a frequency at which the signal intensity of the converted frequency signal is highest.

Here, the distance d measured by the measurement apparatus 100 is expressed by Equation 6. From Equation 6, it can be seen that the distance d can be calculated by using three frequencies $v_c$, $v_s$, and $v_B(m, d)$. Among the three frequencies, $v_B(m, d)$ can be detected as described above. Also, since $v_c$ and $v_s$ are the frequencies determined based on components used in the laser apparatus 110, $v_c$ and $v_s$ should ideally be fixed values. Here, since $v_s$ is the amount of frequency shift by the frequency shifter 112, $v_s$ can substantially be regarded as the fixed value by using a device with a stable shift amount as the frequency shifter 112.

On the other hand, since $v_c$ corresponds to an optical length of the resonator of the laser apparatus 110, it may change due to environmental fluctuations such as temperature. For example, if the laser apparatus 110 is the fiber ring laser, as described in FIG. 2, and the resonator is formed by optical fibers, the resonator length may change by approximately 10 ppm when an ambient temperature changes by one degree Celsius. It should be noted that even if the laser apparatus 110 is a solid-state laser such as a semiconductor laser or the like, the resonator length may be changed by such environmental fluctuations. Therefore, the extraction part 170 extracts the resonator frequency corresponding to the resonator length in order to monitor such a change in the resonator length. The extraction part 170 will be described below.

Figure 7:
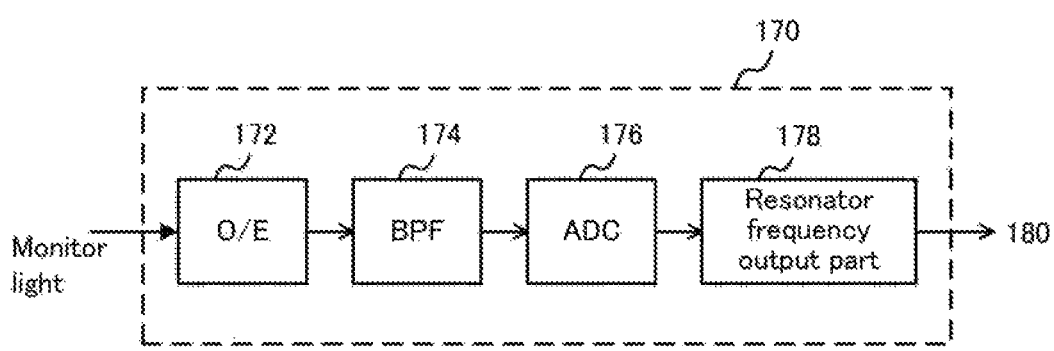
FIG. 7 shows a configuration example of an extraction part 170 according to the present embodiment.

FIG. 7 shows a configuration example of the extraction part 170 according to the present embodiment. The extraction part 170 includes a third photoelectric conversion part 172, a third filter part 174, a third AD converter 176, and a resonator frequency output part 178.

The third photoelectric conversion part 172 converts the monitor light into an electrical signal. The third photoelectric conversion part 172 may be a photodiode or the like. As described in FIG. 4, the laser apparatus 110 outputs the frequency-modulated laser beam having the plurality of longitudinal modes arranged at frequency intervals which approximately match the resonator frequency $v_c$. Therefore, when the third photoelectric conversion part 172 performs a photoelectrical conversion on the frequency-modulated laser beam, an electrical signal including the resonator frequency $v_c$ is outputted.

The third filter part 174 passes, within the electrical signal converted by the third photoelectric conversion part 172, a signal component having the resonator frequency $v_c$ of the laser resonator. The third filter part 174 has, for example, at least one of a high-pass filter, a low-pass filter, a band-pass filter, and a band-rejection filter. FIG. 7 shows an example in which the third filter part 174 is the band-pass filter.

The third AD converter 176 converts inputted analog signals into digital signals. The third AD converter 176 converts analog signals into digital signals in synchronization with a clock signal having a frequency greater than or equal to twice the resonant frequency $v_c$. The third AD converter 176, for example, operates when receiving the clock signal from the clock signal supplying part 210.

The resonator frequency output part 178 converts the digital signal output from the third AD converter 176 into frequency data. As an example, the resonator frequency output part 178 performs a digital Fourier transform (DFT) on the digital signal. The resonator frequency output part 178 analyzes the frequency data and outputs a resonator frequency $v_c$. For example, the resonator frequency output part 178 outputs, as the resonator frequency $v_c$, a frequency at which the signal intensity of the frequency data is the largest.

As described above, the extraction part 170 shown in FIG. 7 extracts the signal component of the resonator frequency $v_c$ from the monitor light and outputs the signal component of the resonator frequency $v_c$. Therefore, even if the resonator length of the laser apparatus 110 changes due to a fluctuation in the ambient temperature, the extraction part 170 can extract and output the signal component of the resonator frequency $v_c$, which corresponds to the change. Since the calculation part 180 uses the fixed value $vs$, $v_B(m,$ d) detected in the above-described manner, and the resonator frequency $v_c$, it is possible to calculate a distance d corresponding to the fluctuation in the ambient temperature.

As described above, even if the environmental fluctuations occur, the measurement apparatus 100 can suppress the reduction of measurement accuracy, since the measurement apparatus 100 monitors the resonator frequency $v_c$ corresponding to the environmental fluctuations and reflects the resonator frequency $v_c$ in the calculation of the distance d. Alternatively or additionally, the laser apparatus 110 may be placed in a temperature-stabilized controlled chamber, such as a thermostatic chamber, to reduce influence of environmental fluctuations and to suppress the reduction of measurement accuracy of the measurement apparatus 100.

However, since the above-mentioned measurement apparatus 100 tends to be a large-scale apparatus, problems such as increases in cost, problems relating to circuit adjustment, installation area, and the like may occur. Therefore, the measurement apparatus according to the present embodiment enables suppressing of the reduction in accuracy with a simple configuration even if such environmental fluctuations occur. Next, such a measurement apparatus will be described.

[Configuration Example of a Measurement Apparatus 300]

Figure 8:
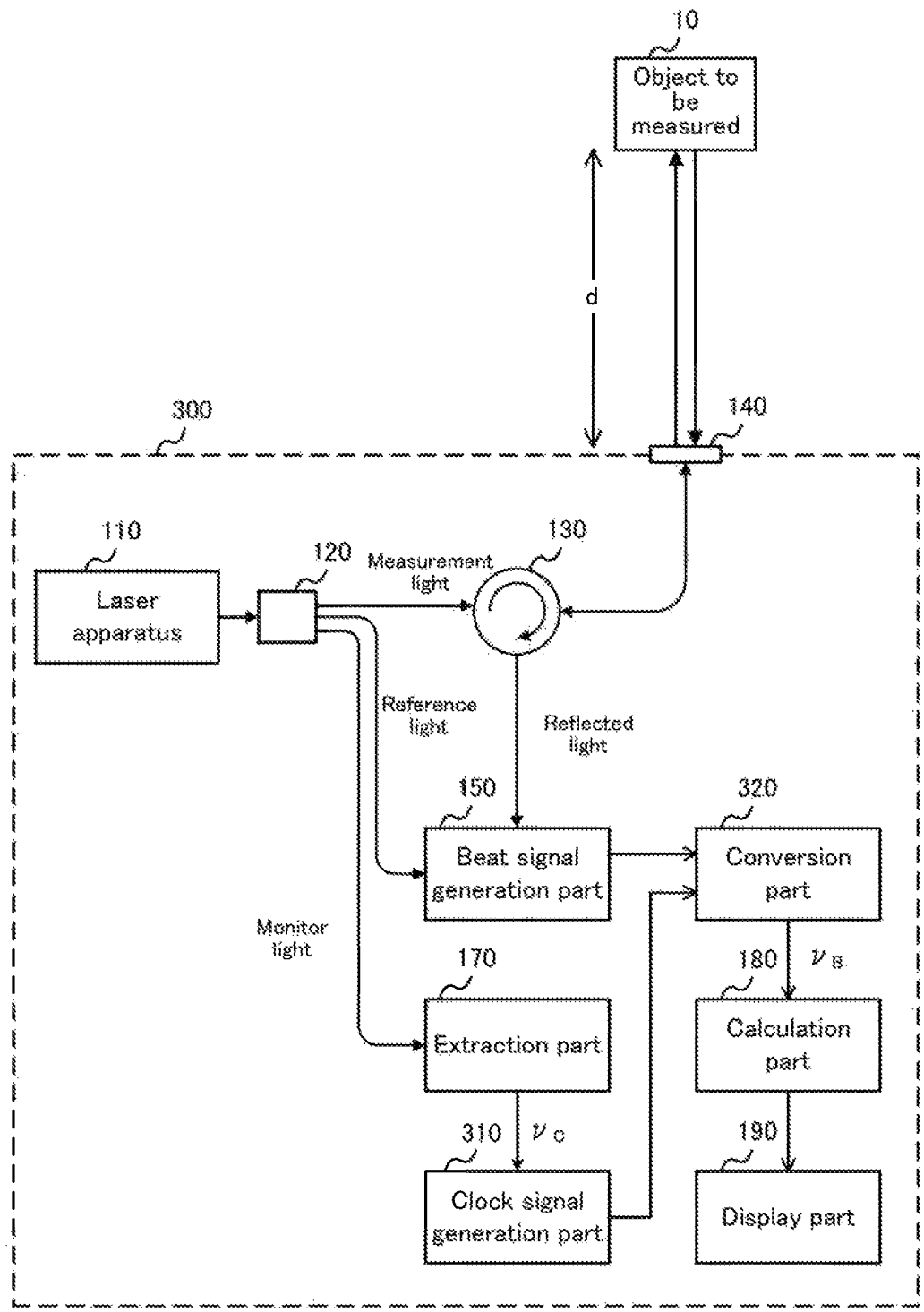
FIG. 8 shows a configuration example of a measurement apparatus 300 according to the present embodiment together with the object to be measured 10.

FIG. 8 shows a configuration example of a measurement apparatus 300 according to the present embodiment together with the object to be measured 10. In the measurement apparatus 300 shown in FIG. 8, operations approximately the same as those of the measurement apparatus 100 according to the present embodiment shown in FIG. 1 are denoted by the same reference numerals, and descriptions thereof are omitted. The measurement apparatus 300 includes a clock signal generation part 310 and a conversion part 320.

The clock signal generation part 310 generates a first clock signal on the basis of the signal component extracted by the extraction part 170. The clock signal generation part 310 supplies the generated first clock signal to the conversion part 320. Then, the conversion part 320 converts the beat signal generated by the beat signal generation part 150 into a digital signal using the first clock signal. Next, the beat signal generation part 150, the extraction par 170, the clock signal generation part 310, and the conversion part 320 provided in the measurement apparatus 300 will be described.

Figure 9:
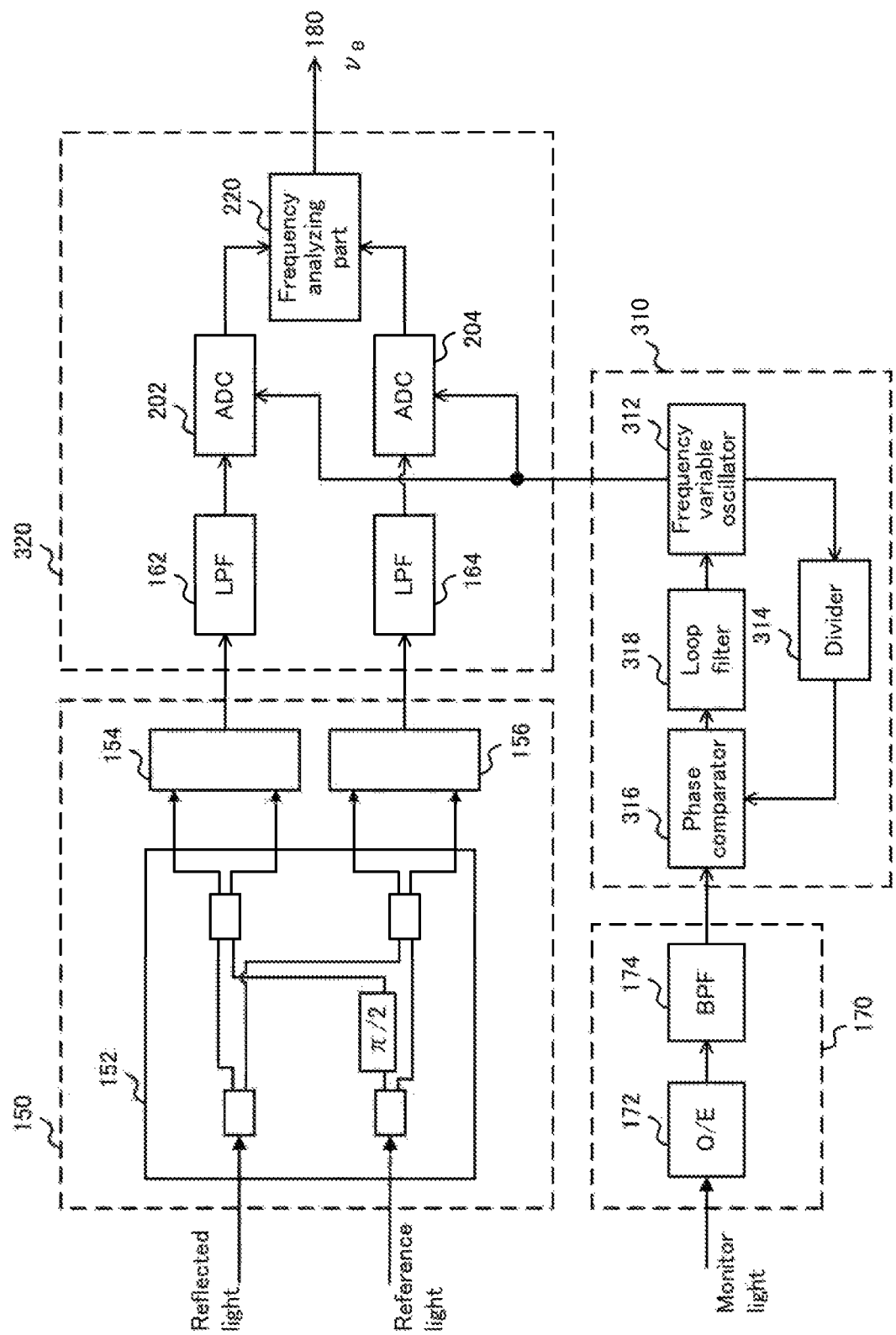
FIG. 9 shows a configuration example of the beat signal generation part 150, the extraction part 170, a clock signal generation part 310, and a conversion part 320 according to the present embodiment.

FIG. 9 shows a configuration example of the beat signal generation part 150, the extraction part 170, the clock signal generation part 310, and the conversion part 320 according to the present embodiment. In the beat signal generation part 150, the extraction pan 170, and the conversion part 320 shown in FIG. 9, operations approximately the same as those of the beat signal generation part 150, the detection part 160, and the extraction part 170 according to the present embodiment shown in FIGS. 5 and 7 are denoted by the same reference numerals, and descriptions thereof are omitted.

The extraction part 170 includes the third photoelectric conversion part 172 and the third filter part 174, and the third photoelectric conversion part 172 extracts the signal component corresponding to the resonator frequency $v_c$ of the laser resonator from within the converted electrical signal. The extraction part 170 supplies the signal component having the resonator frequency $v_c$ passed by the third filter part 174 to the clock-signal generation part 310.

The clock signal generation part 310 generates the first clock signal on the basis of the resonator frequency $v_c$ of the signal component extracted by the extraction part 170. The clock signal generation part 310 includes a PLL circuit, for example. The PLL circuit uses a frequency of the extracted signal component as a reference frequency and outputs a frequency signal having a frequency which is a multiple of the reference frequency. The PLL circuit includes, for example, a frequency variable oscillator 312, a divider 314, a phase comparator 316, and a loop filter 318.

The frequency variable oscillator 312 generates a frequency signal corresponding to a control signal. The frequency variable oscillator 312 is, for example, a voltage-controlled oscillator that generates a frequency signal of a frequency $v_{out}$ corresponding to a voltage value of the control signal.

The divider 314 receives the frequency signal output by the frequency variable oscillator 312 and outputs a divided signal which is a submultiple of the frequency $v_{out}$ of the frequency signal. The frequency divider 314 converts the frequency of the frequency signal into a low frequency of about the frequency $v_c$ of the reference frequency signal and outputs it as the divided signal. Here, a division ratio of the frequency divider 314 is defined as N.

The phase comparator 316 compares a phase of the reference frequency signal to a phase of the divided signal output by the frequency divider 314, and outputs a comparison result. The phase comparator 316, for example, outputs a voltage corresponding to a phase difference between the reference frequency signal and the divided signal as the comparison result.

The loop filter 318 reduces unnecessary noise components, and smoothes and passes the comparison result output from the phase comparator 316. The circuit configuration and circuit constant of the loop filter 318 are determined such that a value of a phase margin in a loop formed by the PLL circuit is within a predetermined range. The loop filter 318 is, for example, a lag lead filter. The loop filter 318 supplies, as the control signal, the signal that passed through the loop filter 138 to the frequency variable oscillator 312.

The PLL circuit described above adjusts the frequency $v_{out}$ of the frequency signal output by the frequency variable oscillator 312 such that the frequency of the frequency-divided signal output by the frequency divider 314 matches the frequency $v_c$ of the reference frequency signal. When the phase of the frequency signal output from the frequency variable oscillator 312 and the phase of the reference frequency signal are synchronized by the PLL circuit, $v_{out} = N \cdot v_c$. As described above, the clock signal generation part 310 outputs, as the first clock signal, the frequency signal having a frequency N times the resonator frequency $v_c$. The value of N is, for example, an integer equal to or greater than one. It should be noted that the clock signal generation part 310 may be a frequency multiplier that outputs a signal having a frequency which is N times the resonator frequency $v_c$ of the inputted signal, instead of the PLL circuit.

The conversion part 320 receives the first clock signal, and converts the beat signal into a first digital signal using the first clock signal. The conversion part 320 includes the first filter pan 162, the second filter part 164, the first AD converter 202, the second AD converter 204, and the frequency analyzing part 220, as described in FIG. 5. Here, the first AD converter 202 and the second AD converter 204 convert the analog signals into the digital signals using the first clock signal. That is, the conversion part 320 includes the first AD converter 202 and the second AD converter 204 that convert the beat signals into the first digital signals in synchronization with the first clock signal. Here, the first digital signals are the I signal converted by the first AD converter 202 and the Q signal converted by the second AD converter 204.

The frequency analyzing part 220 frequency-analyzes the I and Q signals and outputs the frequency $v_B(m, d)$ of the beat signals. Since the operation of the frequency analyzing part 220 has been described with reference to FIG. 6, descriptions thereof are omitted.

As described above, the measurement apparatus 300 according to the present embodiment converts the beat signals into the first digital signals using the first clock signal corresponding to the resonator frequency $v_c$ extracted from the monitor light. In this case, when the resonator length of the laser apparatus 110 changes due to the environmental fluctuations or the like, a clock period of the first clock signal also changes in accordance with changes in the resonator length. Such changes in the first clock signal correspond to changes in the beat signal in connection with the changes in the resonator length of the laser apparatus 110.

In this case, since the conversion part 320 converts, using the first clock signal changed from a constant cycle, beat signals into digital signals by sampling the beat signals changed similarly from the constant cycle, the conversion part 320 operates to cancel out the changes of the resonator length. Therefore, the first digital signal converted by the conversion part 320 becomes a signal approximately equivalent to the digital signals sampled at an approximately constant cycle even if the change occurs in the resonator length of the laser apparatus 110.

The calculation part 180 calculates the difference in the propagation distance between the reference light and the measurement light on the basis of the first digital signal. That is, the calculation part 180 performs a calculation as shown in Equation 6 using the fixed resonator frequencies $v_c$ and $v_s$, and the detected $v_B(m, d)$. By doing this, the measurement apparatus 300 can measure the distance d to the object to be measured 10 while suppressing the reduction of measurement accuracy, even if the fluctuation in the ambient temperature or the like occurs.

As described above, the measurement apparatus 300 can accurately measure the distance d to the object to be measured 10 with the simple configuration without using the frequency analysis of the resonator frequency $v_c$ or the like. In addition, the measurement apparatus 300 can suppress the reduction in measuring accuracy without using the thermostatic chamber or the like. Therefore, in the measurement apparatus 300 according to the present embodiment, it is possible to accurately measure the distanced to the object to be measured 10 while preventing increases in the apparatus scale and cost.

The example where the measurement apparatus 300 according to the present embodiment converts the beat signals, which are analog signals, into the first digital signals in synchronization with the first clock signal corresponding to the resonator frequency $v_c$ extracted from the laser apparatus 110 has been described above, but the invention is not limited to this. The measurement apparatus 300 may use the first clock signal to resample the beat signals converted into the digital signals. Next, the beat signal generation part 150, the extraction part 170, the clock signal generation part 310, and the conversion part 320 provided in Variation Example of the measurement apparatus 300 will be described.

[Variation Example of the Measurement Apparatus 300]

Figure 10:
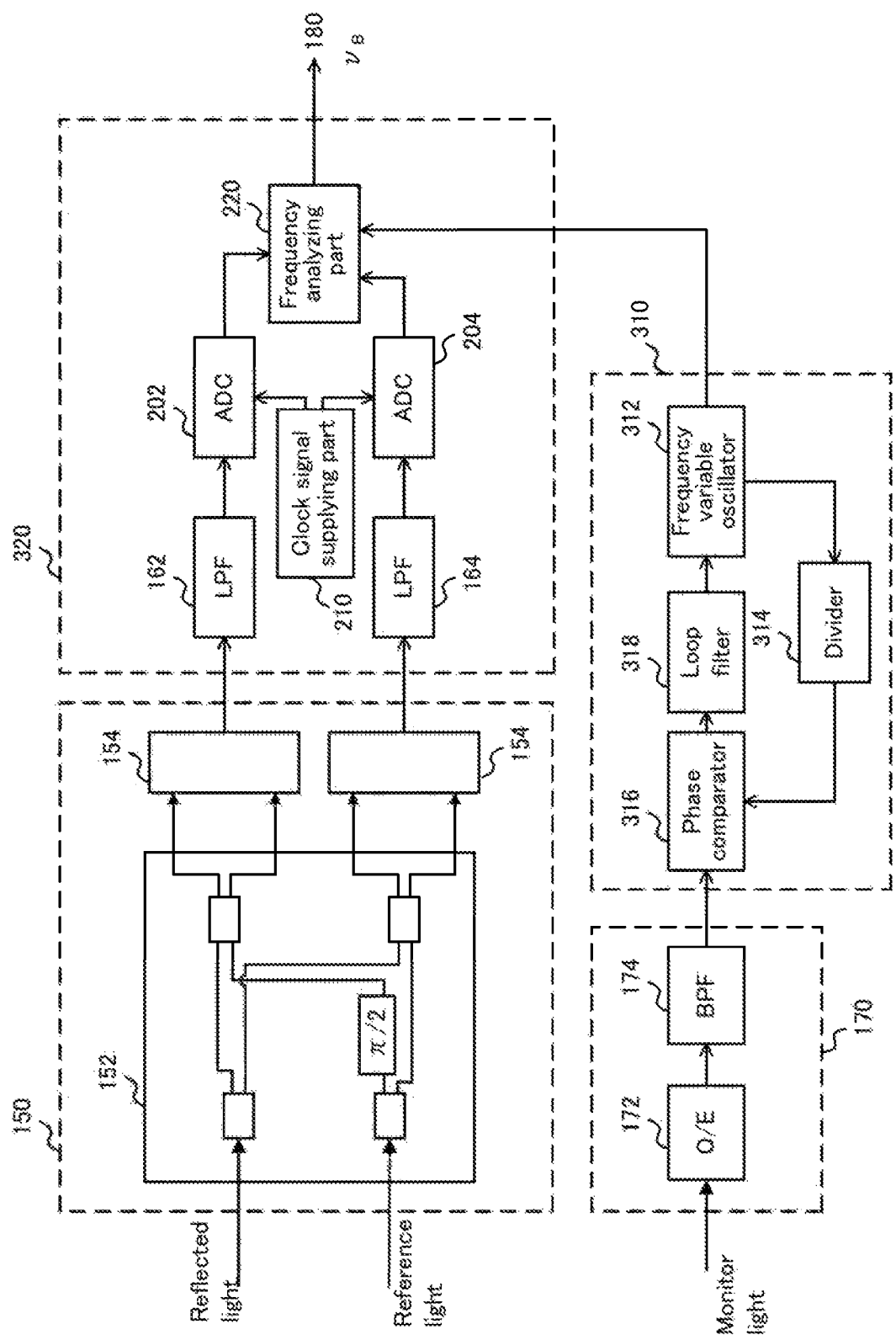
FIG. 10 shows a configuration example of the beat signal generation part 150, the extraction part 170, the clock signal generation part 310, and the conversion part 320 provided in a variation example of the measurement apparatus 300 according to the present embodiment.

FIG. 10 shows a configuration example of the beat signal generation part 150, the extraction part 170, the clock signal generation part 310, and the conversion part 320 provided in Variation Example of the measurement apparatus 300 according to the present embodiment. In the beat signal generation part 150, the extraction part 170, the clock signal generation part 310, the conversion part 320 shown in FIG. 10, operations approximately the same as those of the beat signal generation part 150, the extraction part 170, the clock signal generation part 310, and the conversion part 320 according to the present embodiment shown in FIG. 9 are denoted by the same reference numerals, and descriptions thereof are omitted.

The conversion part 320 further includes a clock signal supplying part 210 that provides a second clock signal to the first AD converter 202 and the second AD converter 204. In this case, the first AD converter 202 and the second AD converter 204 convert the beat signals into second digital signals in synchronization with the second clock signal that is different from the first clock signal. The frequency analyzing part 220 receives the first clock signal from the clock signal generation part 310 and resamples the beat signals $v_B(m, d)$ received from the first AD converter 202 and the second AD converter 204.

That is, the frequency analyzing part 220 further functions as a resampling part for resampling the second digital signals using the first clock signal to output the first digital signals. Here, a known algorithm may be used as a processing circuit, an algorithm, or the like of the resampling process, and descriptions thereof are omitted here.

The frequency analyzing part 220 performs a frequency conversion on the resampled first digital signals in the manner described above and outputs the frequency $v_B(m, d)$ of the beat signals Thus, the calculation part 180 can calculate the distance d to the object to be measured 10. As described above, since the first clock signal is used to convert the beat signals into the first digital signals, the measurement apparatus 300 can measure the distance d to the object to be measured 10 while suppressing the reduction of the measuring accuracy even if the fluctuation in the ambient temperature or the like occurs.

It is preferable that at least a part of the detection part 160, the calculation part 180, and the conversion part 320 provided in the measurement apparatus 100 and the measurement apparatus 300 according to the present embodiment is formed by an integrated circuit or the like. At least a part of the detection part 160, the calculation part 180, and the conversion part 320 includes, for example, a field programmable gate array (FPGA), a digital signal processor (DSP), and/or a central processing unit (CPU).

When at least a part of the detection part 160, the calculation part 180, and the conversion part 320 is formed by a computer or the like, that part includes a storage unit and a control unit. The storage unit includes, for example, a read only memory (ROM) storing a basic input output system (BIOS) or the like of a computer or the like that realizes the detection part 160, the calculation part 180, and the conversion part 320, a random access memory (RAM) serving as a work area. The storage unit may also store an operating system (OS), programs, applications, and/or various pieces of information. The storage unit may include a large-capacity device like a hard disk drive (HDD) and/or a solid state drive (SSD).

The control unit is a processor such as a CPU, and functions as at least a part of the detection part 160, the calculation part 180, and the conversion part 320 by executing programs stored in the storage unit. The control unit may include a graphics processing unit (GPU) or the like.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present disclosure. Further, effects of the new embodiment brought by the combinations also have the effect of the original exemplary embodiment together.

What is claimed is:

1. A measurement apparatus, comprising:
a laser apparatus that has a laser resonator and outputs a frequency-modulated laser beam with a plurality of modes;
a branching part that branches the frequency-modulated laser beam into (i) a portion of the frequency-modulated laser beam output by the laser apparatus as a reference light and (ii) at least some of the remaining portion of the frequency-modulated laser beam as a measurement light;
a beat signal generation part that generates a beat signal by mixing the reference light and a reflected light that is reflected by radiating the measurement light onto an object to be measured;
an extraction part that extracts a signal component corresponding to a resonator frequency of the laser resonator and being superimposed on the frequency-modulated laser beam output from the laser apparatus;
a clock signal generation part that generates a first clock signal on the basis of the signal component;
a conversion part that converts the beat signal into a first digital signal using the first clock signal; and
a calculation part that calculates a difference in a propagation distance between the reference light and the measurement light on the basis of the first digital signal.

2. The measurement apparatus according to claim 1, wherein the branching part branches the frequency-modulated laser beam into the reference light, the measurement light, and a monitor light, and
the extraction part includes a photoelectric conversion part that converts the monitor light into an electrical signal, and extracts the signal component corresponding to the resonator frequency of the laser resonator from within the electrical signal converted by the photoelectric conversion part.

3. The measurement apparatus according to claim 2, wherein the extraction part further includes a filter part that passes the signal component having a resonator frequency of the laser resonator from within the electrical signal converted by the photoelectric conversion part.

4. The measurement apparatus according to claim 1, wherein the clock signal generation part includes a PLL circuit that uses a frequency of the signal component as a reference frequency and outputs a frequency signal having a frequency which is a multiple of the reference frequency, and
outputs the frequency signal as the first clock signal.

5. The measurement apparatus according to claim 1, wherein the conversion part includes an A/D converter that converts the beat signal into the first digital signal in synchronization with the first clock signal.

6. The measurement apparatus according to claim 1, wherein the conversion part further includes:
an AD converter that converts the beat signal into a second digital signal in synchronization with a second clock signal different from the first clock signal, and
a resampling part that resamples the second digital signal using the first clock signal and outputs the first digital signal.

7. A measurement method comprising:
outputting a frequency-modulated laser beam with a plurality of modes from a laser apparatus having a laser resonator;
branching the frequency-modulated laser beam into (i) a portion of the frequency-modulated laser beam as a reference light and (ii) at least some of the remaining portion of the frequency-modulated laser beam as a measurement light;
generating a beat signal by mixing the reference light and a reflected light that is reflected by radiating the measurement light onto an object to be measured;
extracting a signal component corresponding to a resonator frequency of the laser resonator and superimposed on the frequency-modulated laser beam;
generating a first clock signal on the basis of the signal component;
converting the beat signal into a first digital signal using the first clock signal; and
calculating a difference in a propagation distance between the reference light and the measurement light on the basis of the first digital signal.

8. The measurement method according to claim 7, wherein the converting the beat signal into the first digital signal includes converting the beat signal into the first digital signal in synchronization with the first clock signal.

9. The measurement method according to claim 7, wherein the converting the beat signal into the first digital signal includes:
converting the beat signal into a second digital signal in synchronization with a second clock signal different from the first clock signal, and
resampling the second digital signal using the first clock signal and outputting the first digital signal.

10. A light measurement apparatus, comprising:
a laser having a laser resonator and configured to output a frequency-modulated laser beam with a plurality of modes;
a branch configured to branch the frequency-modulated laser beam into (i) a portion of the frequency-modulated laser beam output by the laser as a reference light and (ii) at least some of a remaining portion of the frequency-modulated laser beam as a measurement light;
a beat signal generator configured to generate a beat signal by mixing the reference light and a reflected light that is reflected by radiating the measurement light onto an object to be measured;
an extractor configured to extract a signal component corresponding to a resonator frequency of the laser resonator and being superimposed on the frequency-modulated laser beam output from the laser;
a clock signal generation circuit configured to generate a first clock signal on the basis of the signal component;
a convertor configured to convert the beat signal into a first digital signal using the first clock signal; and
a calculation circuit configured to calculate a difference in a propagation distance between the reference light and the measurement light on the basis of the first digital signal.

* * * * *